Dec. 13, 1966  A. J. MONTANO  3,290,926
FATIGUE TESTING APPARATUS
Filed June 23, 1964
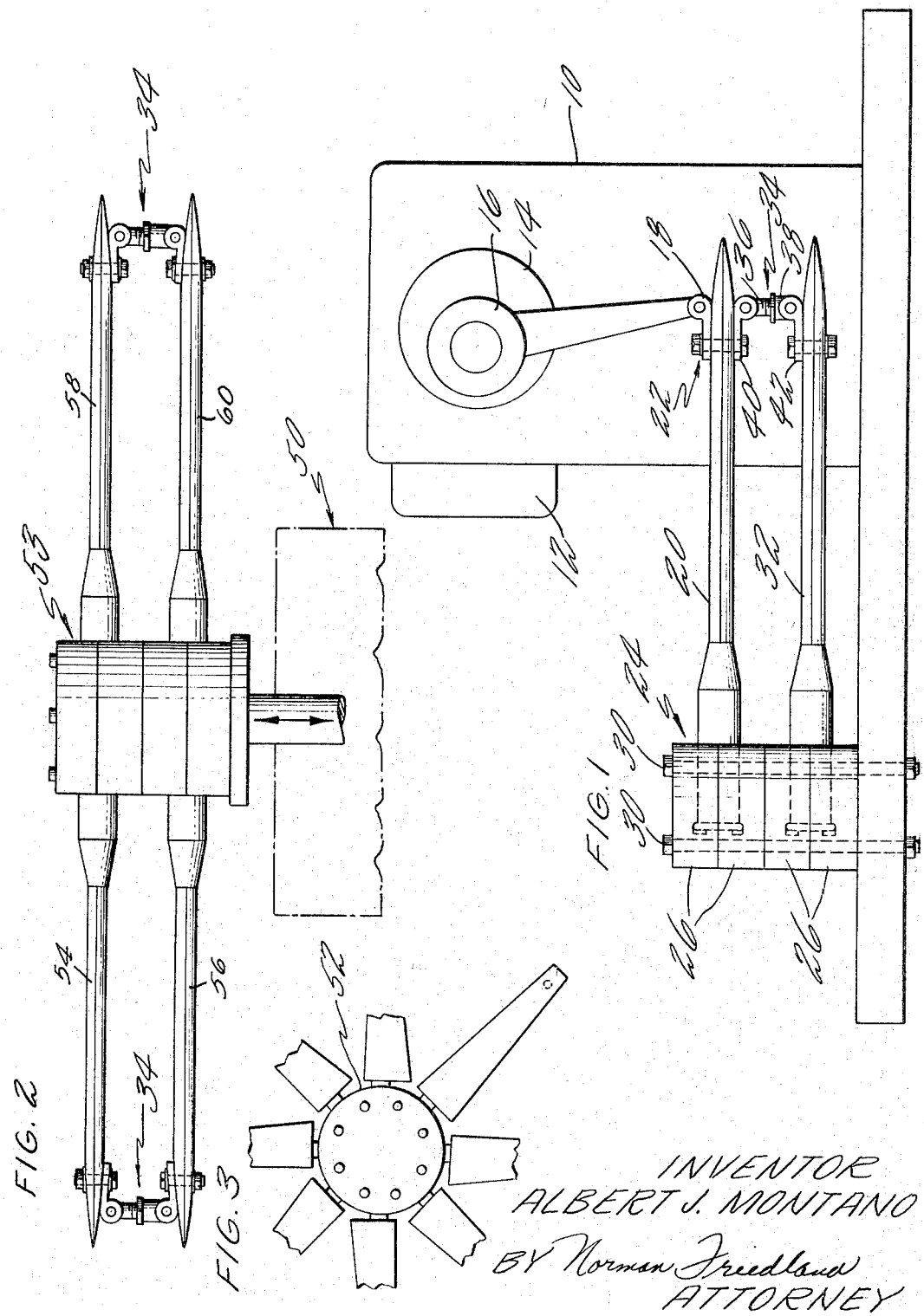
INVENTOR
ALBERT J. MONTANO
BY Norman Friedland
ATTORNEY United States Patent Office 3,290,926
Patented Dec. 13, 1966

3,290,926
FATIGUE TESTING APPARATUS
Albert J. Montano, Hartford, Conn., assignor to United Aircraft Corporation, East Hartford, Conn., a corporation of Delaware
Filed June 23, 1964, Ser. No. 377,285
4 Claims. (Cl. 73—67.3)

This invention relates to testing apparatus and particularly to apparatus for fatigue testing propeller blades and the like.

The heretofore practice for fatigue testing a blade was by securing one end of the blade to a rigid body, and attaching the free end to a vibrating machine for cycling the blade at a predetermined load. In the case of aeronautical propeller blades it was customary to cycle the blade for a period lasting as long as four months. In the heretofore testing apparatus only one blade could be attached to a fatigue testing machine. Generally, the fatigue testing machine was of the type that consisted of an eccentric driven by an electric motor. For mean stress fatigue testing the linkage connecting the free end of the blade to the eccentric would be adjusted in order to preload the blade in a particular deflection position. In so doing, the motor of necessity had to be powerful enough to provide the preloading as well as the additional loading for the cyclic testing.

I have found that I can reduce the size of the motor and simultaneously test a plurality of blades all of which result in a less expensive testing operation, a less expensive testing apparatus and a reduction in testing time. This is accomplished by applying a steady load to a pair or more spaced apart specimens which load does not change appreciably during the normal cyclic loading applied to the specimens being tested.

It is therefore an object of this invention to provide means for prestressing blades or specimens to be fatigue tested.

A still further object of this invention is to provide interconnecting means between spaced blades or specimens or the like mounted in juxtaposed relationship for imparting a constant tension or compression load.

A still further object is to provide means for prestressing specimens intended to be fatigue tested by imparting either a compression or tension stress where such means are characterized as being inexpensive and of simple construction, reducing the testing time, reducing the power consumption and being capable of applying higher frequency to the test specimens.

Other features and advantages will be apparent from the specification and claims and from the accompanying drawings which illustrate an embodiment of the invention.

FIGURE 1 is a side elevation partly in schematic illustrating this invention.

FIGURE 2 is a schematic illustrating another version of this invention, and

FIGURE 3 is a schematic illustrating still another version of this invention.

Referring now to FIG. 1 which generally illustrates a preferred embodiment of this invention, showing the fatigue test rig as generally comprising motor support member 10 supporting motor 12 which may be motivated electrically, pneumatically or hydraulically for rotating shaft 14. Shaft 14 may carry a suitable eccentric 16 which has one end fixed to clamp member 18. Clamp member 18 is rigidly secured to the free end of the specimen 20 to be tested. Such securing may be accomplished by any suitable means such as welding, brazing or by the illustrated version of a nut and bolt assembly generally indicated by numeral 22. The other end of the specimen 20 is rigidly secured to the holding mechanism generally indicated by numeral 24 which comprises suitably stacked collars 26 having a cavity portion for receiving and retaining one end of the specimen to be tested. Suitable fastening means such as a nut and bolt arrangement passing through the entire assembly and generally indicated by numeral 30 firmly secures the end of the specimens to be tested. A second specimen to be tested is also secured like the first specimen in spaced aligned relationship thereto. As shown in the drawing, blade 32, like blade 20, is firmly secured to the holding mechanism 24.

In accordance with this invention a prestressing member generally indicated by numeral 34 is interposed between the two blades at some point spaced outwardly from the rigid holding mechanism 24. This member may comprise an externally threaded member 36 and internally receiving threaded member 38 each of which are connected to the clamping members 40 and 42 respectively. Clamping members 40 and 42 which may take the form of flat plates having a bifurcated end receiving the ends of members 36 and 38 are firmly secured to the respective blades 20 and 32 in any suitable manner as by the nut and bolt assemblies 22 and 43 respectively. Obviously, turning bolt 36 with respect to member 38 will deflect the blades inwardly or outwardly with respect to each other for prestressing the specimens in tension or compression, as desired.

From the foregoing it is apparent that upon adjusting the threaded member 36, it is possible to preload the blades at a particular stress level. In practice, a customary strain gauge attached to the specimens would give a direct reading of the load imposed by the prestressing member 34. Hence, in mean stress fatigue testing it is not necesary now to preload the blades by use of the eccentric arm and motor as was necesary in heretofore testing practice. Then it is obvious that for cyclic testing in the mean stress test the only load that is imposed by the electric motor 12 is the cyclic load. The mean load is imposed by the prestressing mechanism 34.

In practice for mean stress fatigue testing wherein the specimens are urged toward each other, I have found that I can attach a cable to each of the blades and adjust the cable to urge the blades toward each other. While not limited thereto, such a cable would be secured to the top face of the upper specimen and to the bottom face of the lower specimen. In this arrangement the cable could extend through holes formed in the specimens. Some rotable movement about the axis of the clamp securing the ends of the specimens is permissible so that the specimens may seek a satisfactory position relative to each other. In this arrangement one of the specimens may move forward or rearward relative to the other specimen. Hence, the specimens may be slightly misaligned or stated another way, the specimens are only in substantial alignment relative to each other.

It is also contemplated within the scope of this invention that when using a rigid prestressing device rather than the cable mentioned above, the ends of such a device may be mounted in a universal type of joint to allow or permit slight misalignment.

Once the basic concept of this invention is understood, it will be appreciated that the concept can be employed to fatigue test a plurality of specimens. As noted above, basically the only requirement for practicing this invention is that two specimens are spaced in alignment or substantial alignment and that the specimens form a free beam. The mean load then is imposed by applying a steady load, which as shown, takes the form of an adjusting member mounted between the spaced apart specimens. The prestressing member is adjusted to preselect the value of the mean stress. Since the load is imposed by the specimens working against each other, this load is not imposed by the motor. Consequently, the motor is solely used for cyclic loading.

Owing to this feature, the motor can be made smaller for comparable testing with heretofore known testing apparatus, thus realizing a reduction in cost in apparatus, operation and maintenance. Also, because of the reduction of load on the motor in a mean stress fatigue test the motor can also run at higher frequencies than the heretofore known test rig motors, hence realizing a reduction in testing time and operational cost.

From the foregoing it is apparent that a number of specimens may be stacked in space relationship one on top of the other, or may be spaced around the periphery of the clamping mechanism as illustrated in FIGS. 2 and 3. Of course, it is to be understood that the invention is not limited to these particular embodiments, but are shown to exemplify the manner in which this invention can be practiced.

As noted in FIG. 2, the holding mechanism generally indicated by numeral 53 is reciprocally supported to a motor (not shown) encased in housing 50. The stacked clamps which are similar in construction to those shown in FIG. 1, and not described in detail here for the sake of convenience, firmly secure four specimens as shown in the drawing. A pair of means stressing mechanism 34 similar in construction as the one shown in FIG. 1 is interposed between each of the parallelly disposed specimens 54 and 56 and 58 and 60 at a point intermediate the ends of the specimen. The particular point selected is not of too great importance although a greater preload is obtainable by locating it closer to the free end of the specimen.

FIG. 3 illustrates a plurality of specimens spaced about the periphery of holding mechanism 52.

It should be understood that the invention is not limited to the particular embodiments shown and described herein, but that various changes and modifications may be made without departing from the spirit or scope of this novel concept as defined by the following claims.

I claim:
1. An apparatus for fatigue testing substantially identical specimens comprising:
   a holding mechanism for mounting the specimens in aligned parallel positions in which the specimens have a single degree of freedom in a common plane;
   adjustable means interconnecting said specimens for forcing said specimens toward or away from each other in the plane of free movement so as to stress each member in a similar manner; and
   means for vibrating said holding mechanism so as to cause said specimens to oscillate as a single member in the plane of free movement
   whereby said specimens may be oscillated at their resonant frequencies with a minimum of power.

2. An apparatus for fatigue testing propeller blades comprising:
   means for holding a pair of blades at their root ends so that they extend from said holding means in an aligned, spaced cantilever fashion;
   means interconnecting the free ends of the blades for forcing them toward or away from each other; and
   means for vibrating said holding means along an axis which is transverse to the longitudinal axis of the blades.

3. An apparatus as defined in claim 2 in which said interconnecting means is adjustable so as to change the initial stress in said specimens.

4. An apparatus as defined in claim 2 wherein:
   said holding means is designed so that the blades are mounted horizontally; and
   said holding means is vibrated along a vertical axis.

References Cited by the Examiner

UNITED STATES PATENTS

| | | | |
|---|---|---|---|
| 1,091,219 | 3/1914 | Harvey | 73—161 |
| 1,485,835 | 3/1924 | Bothezat et al. | 73—91 |

FOREIGN PATENTS

| | | |
|---|---|---|
| 627,501 | 8/1949 | Great Britain. |

RICHARD C. QUEISSER, *Primary Examiner.*

CHARLES A. RUEHL, *Assistant Examiner.*